United States Patent Office 2,828,935
Patented Apr. 1, 1958

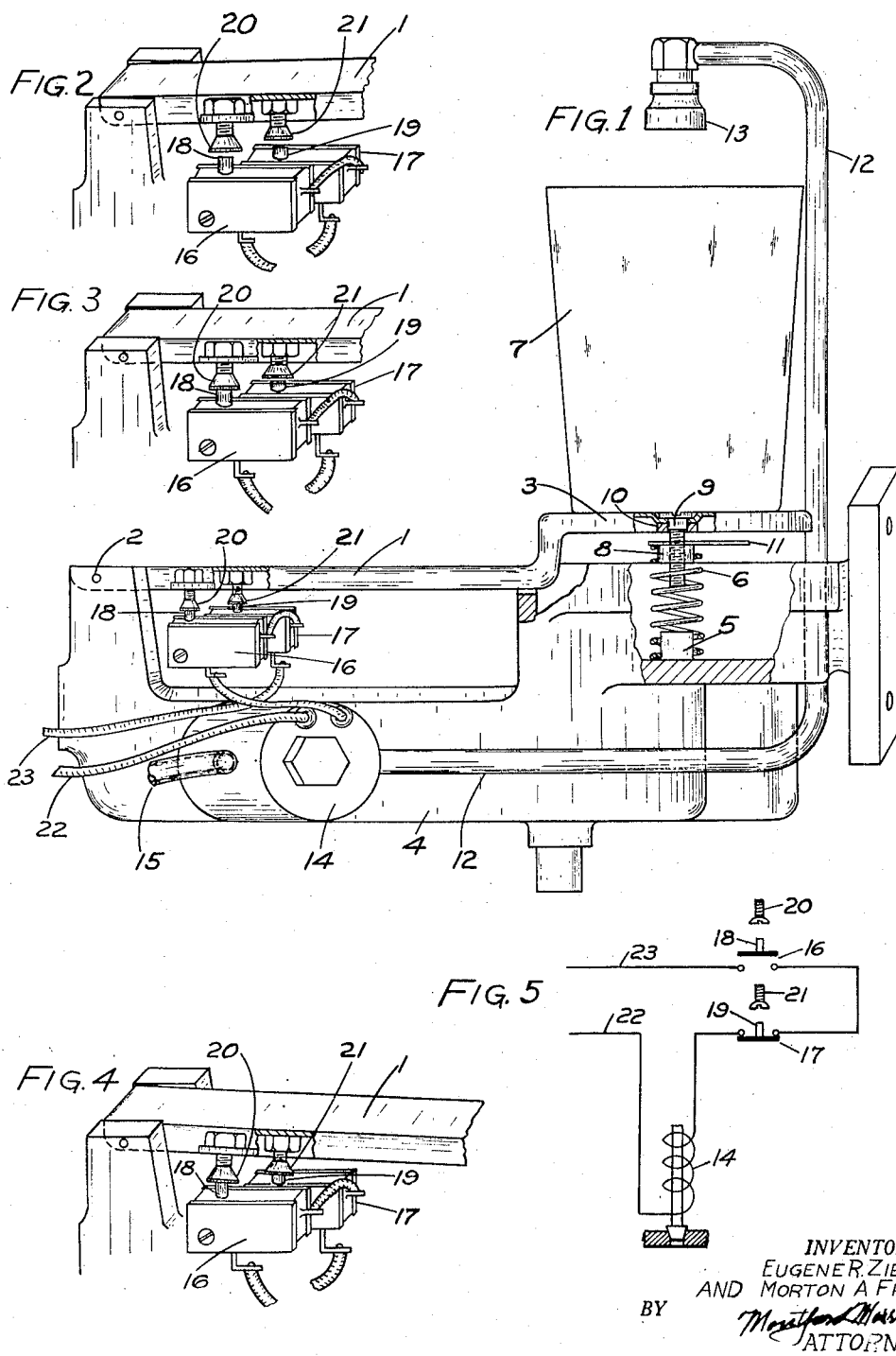

2,828,935
AUTOMATIC CONTAINER FILLER

Eugene R. Ziegler, Spencerport, and Morton A. Frank, Rochester, N. Y., assignors to Ritter Company, Inc., Rochester, N. Y., a corporation of Delaware Application May 14, 1954, Serial No. 429,724

9 Claims. (Cl. 249—63)

This invention relates to automatic devices for partially filling removable containers with water or other liquids, one object of the invention being to provide a fully automatic and more efficient device of the above character, adapted to form part of an article of furniture, or the like, such, for example, as a dental equipment stand, for filling a drinking glass or other container commonly supported thereon.

Another object is the provision of such device having a more sensitive valve-actuating mechanism specially adapted for responding in an accurate and reliable manner to a relative small force, such as the weight of a drinking glass.

A further object is to provide a device of the nature described, capable of operation without any unsightly dripping or spilling of the water.

To these and other ends the invention resides in certain improvements and combinations of parts, all as will be hereinafter more fully described, the novel features being pointed out in the claims at the end of the specification.

In the prior art of container fillers of the character described herein, the mechanisms for weighing the amount of liquid to be discharged into the container depends directly upon the weight of the liquid to be weighed to operate valves to start and stop the flow of the liquid to be weighed. When small weights of liquid are employed, such as the water commonly poured out by a dentist for his patients to use as a mouth rinse, it is very difficult to obtain satisfactory mechanism to differentiate between these small weights of liquid and an empty container, the result being that such delicate mechanism as has had to be employed heretofore has resulted in a large number of failures in the field when in operation, which results in an unsatisfactory device for use in dental offices.

The present invention seeks to eliminate these delicate mechanisms by the employment of a strong magnetically operated valve to do the opening and closing of the discharge ducts and to depend only upon highly developed and extensively field-tested, sensitive miniature electrical switches for valve operation by the weight of liquid to be measured.

This invention greatly increases the reliability of devices of the category of container fillers such as is used in dentists' offices, physicians' offices and in similar applications.

In the drawings:

Fig. 1 is a general view of the device shown in perspective with some structural detail.

Figs. 2, 3, and 4 show different positions of the mechanism employed in the structure of the device, illustrative of steps in the accomplishment of the desired results.

Fig. 5 is a diagrammatic view of the circuit of the arrangement of our invention.

Referring to Fig. 1, 1 is a spring-balance weighing arm having a fulcrum point at position 2 and a weighing pan or support 3. Supporting frame structure 4 provides support for fulcrum 2 and a base support 5 for a spring-balance weighing spring 6, which supports the weighing pan or container support 3.

A removable container for liquids 7 rests upon weighing pan or container support 3, and the amount of vertically downward movement of weighing pan 3 is determined by the weight of container 7 plus the liquid load and the weighing spring 6, the tension of which may be adjusted to suit the results desired. Spring 6 is provided with a fitted nut 8, into which is threaded a screw 9, which supports weighing pan 3 by means of a washer 10, fixed to the body of screw 9.

Weighing pan or support 3 has no upper limit stop, but the height of the pan 3 above the base support 5 is determined by holding the lever 11, fixed to nut 8, and adjusting screw 9 in or out to the desired height above the base support 5. This adjustment does not change the length of the spring 6 since the lever 11 is held when the screw 9 is adjusted. A change in the length of the spring would change the weight required to compress it a given amount. A liquid duct or conduit 12, having a nozzle 13, is provided, and the liquid duct 12 is connected to a suitable common type of solenoid-operated valve 14, which has a duct 15 connected to a source of liquid supply.

The solenoid-operated valve 14 is of the type which is normally closed in the absence of electric current and is opened only by the supply of electric current to the winding of this valve.

In Figs. 1, 2, 3 and 4, members 16 and 17 are miniature electrical switches such as are commonly supplied on the market and which are fixed to support frame 4 and operated by switch buttons 18 and 19.

Switches 16 and 17 are connected in series with solenoid-operated valve 14 as shown in the figures. Switch 16 is of the normally open type and switch 17 is of the normally closed type, so that when buttons 18 and 19 are not depressed, the circuit to solenoid-operated valve 14 is normally open. Leads 22 and 23 are connected to a suitable source of electric current.

Fixed to spring-balance weighing arm 1 are adjustable feet or switch actuating members 20 and 21, Figs. 1 and 2, for depressing switch buttons 18 and 19.

The normal position of spring-balance arm 1 in the absence of container 7 on weighing pan 3 is shown in Fig. 2, in which both depression feet 20 and 21 are entirely clear of switch buttons 18 and 19.

Upon placing a suitable container 7 upon weighing pan or container support 3, spring-balance weighing arm 1 falls to the position shown in Fig. 3, in which depression foot 20 actuates switch button 18, closing the normally open switch 16, which in turn operates valve 14, and liquid begins to flow through duct or conduit 12 and nozzle 13 into container 7. As the liquid from nozzle 13 begins partially to fill the container 7, spring-balance weighing arm 1 is forced down to the position shown in Fig. 4, depressing button 19 of normally closed switch 17, which in turn opens the circuit to valve 14, allowing valve 14 to close to its normal status. The circuit in accordance with the above description has been shown in Fig. 5, the diagrammatic showing illustrating the switch positions corresponding to Fig. 2.

Thus by selection of the weight of container 7, the weight of the liquid to be discharged into container 7, the adjustment of screw 9, and the adjustments of feet 20 and 21, the described structure functions to start the flow of liquid upon the placing of container 7 upon weighing pan 3 and causes the liquid to be turned off when the desired amount of liquid is filled into the container.

Obviously, modifications and variations of the disclosed structure may be made without departing from the spirit of the invention; and while only one embodiment of the

We claim:

1. An automatic container filler comprising, in combination, a support for a container to be filled, means for counterbalancing said support, said container support having three positions, an uppermost position determined by the absence of a container thereon, a second position determined by the presence of a container thereon and a lowermost position determined by the weight of liquid with which the container is to be filled, a conduit through which liquid is supplied to said container, a valve normally biased to closed position in said conduit, a normally open switch and a normally closed switch, and a circuit through said switches, an adjustable switch actuating member carried by said support, said normally open switch being closed by said switch actuating member upon depression of the support to said second position by placing a container thereon to close said circuit through said normally closed switch to open said valve and enable filling of the container, the increase in weight on said support due to the filling of the container depressing said support to said third position such that the normally closed switch is opened and the valve is closed.

2. An automatic container filler in accordance with claim 1 which the valve is solenoid operated and is normally closed when the winding thereof is not energized, said normally open switch, said normally closed switch and the winding of the solenoid being in series whereby the valve cannot be open when either of said switches is open.

3. An automatic container filler comprising, in combination, a support for a container to be filled, means for counterbalancing said support, said support having three positions, an uppermost position determined by the absence of a container thereon, a second position determined by the presence of a container thereon and a lowermost position determined by the weight of liquid to which the container is to be filled, a conduit through which liquid is supplied to said container, a valve normally biased to closed position in said conduit, a pair of switches mounted beneath said support, one of said switches being a normally open switch and the other of said switches being a normally closed switch, a pair of adjustable switch actuating members carried by said support on the lower side thereof in alignment with said switches, a circuit through said switches, said circuit including a solenoid for operating said valve, said valve being closed when the solenoid winding is not energized, said normally open switch, said normally closed switch and the winding of the solenoid being in series whereby the valve cannot be open when either of said switches is open, said normally open switch being closed by its switch actuating member upon depression of the support to said second position by placing a container thereon to close said circuit through said normally closed switch to open said valve and enable filling of the container, the increase in weight on said support due to the filling of the container depressing said support to said third position to thereby lower the other of said switch actuating members into engagement with its switch to open said switch and close said valve.

4. An automatic container filler comprising, in combination, a support for a container, means for pivoting said support, means including a spring for counterbalancing said support, said support having three positions, an uppermost position determined by the absence of a container thereon, a second position determined by the presence of a container thereon and a lowermost position determined by the weight of liquid to which the container is to be filled, a conduit through which liquid is supplied to said container, a valve normally biased to closed position in said conduit, a normally open switch and a normally closed switch, a circuit through said switches, switch actuating members carried by said support, said normally open switch being closed upon depression of the support to said second position by placing a container thereon to close said circuit through said normally closed switch, the increase in weight on said support due to the filling of the container depressing said support to said third position such that the normally closed switch is opened, means for opening and closing said valve in accordance with the condition of said switches, and means for changing the position of said support when in its uppermost position to vary the degree of movement of said support required to actuate said switches to allow for variations in the weight of the container utilized and amount of fill of the container desired.

5. An automatic container filler in accordance with claim 4 in which the position of the support may be varied without changing the compression of said spring.

6. An automatic container filler in accordance with claim 4 in which said last mentioned means includes a screw mounted on the platform in a position where it is exposed for adjustment when the container is removed, a nut threaded on the screw, the position of said platform being varied when the nut is held and the screw adjusted therein without changing the compression of said spring.

7. An automatic container filler in accordance with claim 4 in which means are provided for adjusting the position of said switch actuating members to vary the position of the support at which said switches will be actuated.

8. An automatic container filler comprising, in combination, a housing, a support, pivot means between said housing and said support, said support having a container receiving position remote from said pivot means, a spring in said housing beneath said support and normally urging said support to an uppermost position, said support having three positions including said uppermost position in which no container is on said support, a second position determined by the weight of a container on said support and a lowermost position determined by the weight of the container and the weight of the liquid with which the container is to be filled, a conduit through which liquid is supplied to said container, a solenoid actuated valve normally biased to closed position in said conduit having a winding, said normally open switch, said normally closed switch and said winding being in a series circuit whereby said valve cannot be opened to allow flow of liquid to said container unless both switches are closed, said switches being located beneath said support and being actuated by movements thereof, said normally open switch being closed upon depression of the support to said second position by placing a container thereon to close said circuit through said normally closed switch to open said valve and enable filling of the container, the increase in weight on said support due to the filling of the container depressing said support to said third position to the end that the normally closed switch is opened and the valve is moved to a closed position.

9. An automatic container filler in accordance with claim 8 in which means are provided between said support and said switches for adjusting the positions of said support at which said switches are successively actuated.

References Cited in the file of this patent

UNITED STATES PATENTS

| | | |
|---|---|---|
| 1,082,354 | Mulloy | Dec. 23, 1913 |
| 2,011,608 | Belknap | Aug. 20, 1935 |
| 2,351,606 | Gold et al. | June 20, 1944 |
| 2,395,674 | Lauterbach | Feb. 26, 1946 |
| 2,451,891 | Vagim | Oct. 19, 1948 |
| 2,464,545 | Ahlburg et al. | Mar. 15, 1949 |
| 2,541,915 | Culver | Feb. 13, 1951 |
| 2,544,155 | Harkenrider | Mar. 6, 1951 |
| 2,548,473 | Gregory | Apr. 10, 1951 |
| 2,698,156 | Bronk | Dec. 28, 1954 |